G. HONOLD.
COUPLING FOR IGNITION MACHINES.
APPLICATION FILED SEPT. 23, 1910.
1,105,660.
Patented Aug. 4, 1914.
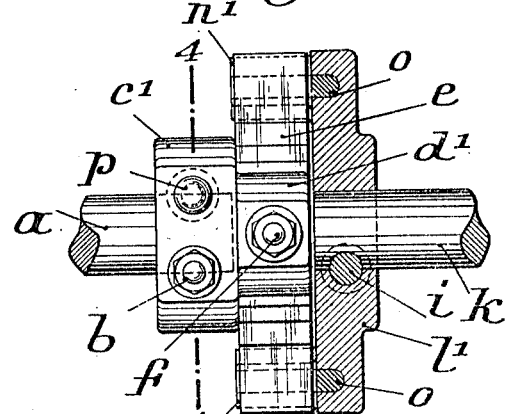
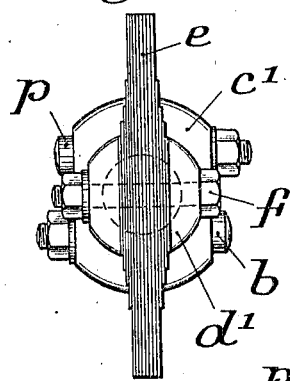
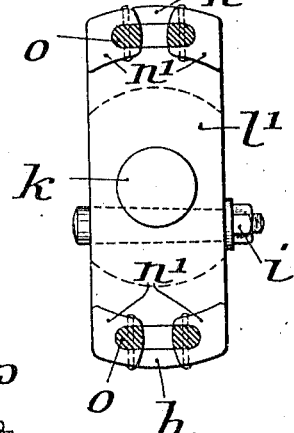
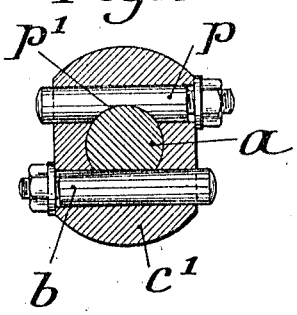
WITNESSES
INVENTOR
Gottlob Honold

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

COUPLING FOR IGNITION-MACHINES.

1,105,660.  Specification of Letters Patent.  Patented Aug. 4, 1914.

Application filed September 23, 1910. Serial No. 583,378.

*To all whom it may concern:*

Be it known that I, GOTTLOB HONOLD, a subject of the Emperor of Germany, and residing at Stuttgart, Germany, have invented certain new and useful Improvements in Couplings for Ignition-Machines, and I do hereby declare the following to be a full, clear, and exact description of the invention, such as will enable others skilled in the art to which it appertains to make and use the same.

The invention relates to a coupling device for driving electric ignition machines for combustion engines in particular. Inasmuch as these machines are usually provided with double T-armatures, as is well known, the driving force required at the various positions of the armature is by no means constant, but varies between relatively wide limits, as a result of similar variations in the field strength. It is practically *nil* when the pole pieces of the armature are exactly opposite those of the field magnet and it increases gradually up to the point preceding the position in which the magnetic lines of force through the armature core are reversed, and then it decreases very suddenly, finally reaching a negative value when the armature has rotated through 180° from its initial position. Here it again becomes practically *nil* and goes through the same changes anew. If, therefore, such an armature is coupled rigidly to the driving shaft of the engine and is driven at constant speed, then these widely varying forces require that the driving shaft be much stronger than would be required if the torque of the armature were constant throughout a cycle of rotation. Furthermore, with a rigid coupling it is necessary to have accurate alinement between the abutting shafts, unless some provision is made for variation and wear by allowing mechanical play between the coupling parts, which procedure, however, results in noise, shock and excessive wear. Heretofore spring coupling devices have been used, but their flexibility has been secured at the expense of definiteness of the ignition period. The essential features are that the flexibility secured be sufficient to provide for normal variations of alinement and wear and that the rotation of the ignition machine still be maintained at synchronism well enough to give the desired definite position to the ignition period.

The invention fulfils these requirements by interposing between the armature of the ignition machine and the driving shaft a spring coupling of the novel, simple and compact form illustrated in the accompanying drawings, of which—

Figure 1 is a side view of the coupling, partly in section; Fig. 2 is an end view of the part $c'$ of the coupling; Fig. 3 is an end view of the other part $l'$ of the coupling; Fig. 4 is a cross section on line 4—4 of Fig. 1.

The coupling element $c'$ is fixed on the end of the shaft $a$ (for example, the armature shaft) by means of a wedge $b$, and the cut away disk section $l'$ is fixed by a wedge $i$ upon the other shaft $k$ (for example, the driving shaft). The disk $c'$ is provided with a nipple $d'$, preferably of cylindrical form and made integral with the disk. The nipple $d'$ is slotted longitudinally and flattened off on both sides, and in the slot is inserted a magazine $e$ of thin plate springs held fast in position by a bolt $f$. The cut away disk $l'$ is provided with four shoulders $n'$, and a fork-shaped block $o$ of fiber, vulcanite or the like, is inserted directly in each of the two cheek pieces of the part $l'$ of the coupling. When the coupling is put together, the ends of the plate spring magazine $e$ lie in the recesses $h$ of the other part of the coupling, and the driving force is transmitted from shaft $k$ to shaft $a$ by means of the plate spring magazine $e$. In consequence of its yielding qualities under load, the plate spring magazine continually rubs on the blocks $o$, which, being of softer material, constitute wearing surfaces which are easily replaceable when worn out by the rubbing action of the spring magazine.

In couplings of this kind it is of great practical importance that the two coupled shafts, *i. e.*, the driving shaft actuated by the engine and the armature shaft of the ignition machine, should be brought very exactly into a definite relative position, so that the ignition occurs exactly when the curve of electromotive force produced by the ignition machine is nearing its maximum. A device for this purpose is indicated in Figs. 1 and 2, and shown more specifically in Fig. 4. One of the coupling members $l'$ is fastened to one of the shafts to be coupled, by the wedge pin $i$, and the other coupling member is then carefully adjusted into the correct position by the following mechanism. In the hub of the coupling disk $c'$ a cylindrical hole is bored, into which is inserted a cylindrical bolt $p$ which has on one side a circular segment shaped recess at $p'$, exactly fitting the cylindrical surface of the shaft. To adjust the coupling member $c'$ on the shaft, the bolt $p$ is first placed in its cylindrical hole with the recess in position to receive the cylindrical surface of the shaft, and the hub of the coupling member is then shoved upon the end of the shaft. The coupling members $c'$ and $l'$ are then brought into coupling engagement and the nut of the bolt $p$ is screwed up to such an extent that the hub $c'$ can be shifted around the shaft only with difficulty. Thereupon the armature is brought exactly into the position which it is to have when running and the nut of the bolt $p$ is further tightened. Hub $c'$ is thereby exactly fixed on the shaft $a$. On the side opposite the bolt $p$, the hub is provided with a second tangential bore for the reception of a wedge $b$. The shaft $a$ at this place, however, is yet left round, so that its periphery projects into the bore for the wedge $b$. The portion of the shaft's periphery projecting into the bore, is thereupon removed by boring or filing, when thereafter the wedge $b$ is drawn in and clamped fast by the aid of its nut, the coupling is fixed upon the shaft exactly in the adjusted position. This mechanism permitting the exact adjustment of the coupling device is not claimed in the present application, but forms the subject matter of a divisional application, Serial No. 656,493, filed by me on October 24, 1911.

Now it is evident, from the above description, that inaccuracies in mechanical alinement, either vertical or horizontal, are taken care of by the coupling of my invention, since the spring plates are free to slide radially between the cheek pieces of the other coupling part, and since other inaccuracies in alinement are compensated for by flexure of the spring plates. However, the spring plates are so chosen and arranged that their flexibility does not permit undesirable variation from synchronous speed at any point of a cycle of rotation. Furthermore, the flexibility provided reduces somewhat the required size of the two shafts.

What I claim is:—

In a shaft coupling device for ignition machines for combustion engines, two coupling parts, a magazine of spring plates clamped to one coupling part, cheek pieces rigidly fixed on the other coupling part embracing the said magazine of spring plates, and a fork-shaped block of relatively soft wearing material set in said cheek pieces: substantially as described.

In testimony whereof I affix my signature, in presence of two witnesses.

GOTTLOB HONOLD.

Witnesses:
MAX ANSCHÜTZ,
REINHOLD ELWERT.